United States Patent

Yamashita et al.

[11] Patent Number: 6,087,418
[45] Date of Patent: Jul. 11, 2000

[54] CEMENT ADMIXTURE AND CEMENT COMPOSITION

[75] Inventors: Akihiko Yamashita, Suita; Tsuyoshi Hirata, Kobe; Tsutomu Yuasa; Hirokazu Niwa, both of Osaka, all of Japan

[73] Assignee: Nippon Shokubai Co., Ltd., Osaka, Japan

[21] Appl. No.: 09/223,248

[22] Filed: Jan. 1, 1999

[30] Foreign Application Priority Data

Jan. 22, 1998 [JP] Japan .................. 10-010048

[51] Int. Cl.$^7$ .............. C08K 3/34; C08L 33/08; C08L 33/17
[52] U.S. Cl. ........................ 524/5; 524/4
[58] Field of Search ................................. 524/4, 5

[56] References Cited

U.S. PATENT DOCUMENTS

| | | | |
|---|---|---|---|
| 4,494,999 | 1/1985 | Harris | 524/5 |
| 4,668,295 | 5/1987 | Bajpai | 524/5 |
| 4,808,641 | 2/1989 | Yagi et al. | 524/5 |
| 5,162,402 | 11/1992 | Ogawa et al. | 524/5 |
| 5,556,460 | 9/1996 | Berke et al. | 524/5 |
| 5,614,017 | 3/1997 | Shawl | 524/5 |
| 5,660,626 | 8/1997 | Ohta et al. | |
| 5,707,445 | 1/1998 | Yamato et al. | 524/5 |
| 5,911,820 | 6/1999 | Satoh et al. | 524/5 |

FOREIGN PATENT DOCUMENTS

| | | |
|---|---|---|
| 0 725 043 A2 | 8/1996 | European Pat. Off. |
| 0 799 807 A2 | 10/1997 | European Pat. Off. |
| 0 850 895 A1 | 7/1998 | European Pat. Off. |
| 6-092703 | 4/1994 | Japan |
| 6-144906 | 5/1994 | Japan |
| 7-247150 | 9/1995 | Japan |
| 8-053522 | 2/1996 | Japan |
| 8-268741 | 10/1996 | Japan |
| 9-040446 | 2/1997 | Japan |

*Primary Examiner*—Peter A. Szekely

[57] ABSTRACT

The present invention provides a cement admixture and a cement composition, both of which displays little dependence of the water-reducibility upon temperature in that these cement admixture and cement composition involve little slump loss at high temperature and little increase in the amount of addition at low temperature. The cement admixture comprises the following essential components: either or both of polymer (A) and polymer salt (AA), wherein polymer (A) includes constitutional unit (I) of general formula (1) below as an essential constitutional unit, and polymer salt (AA) is obtained by further neutralizing polymer (A) with an alkaline substance; and either or both of polymer (B) and polymer salt (BB), wherein polymer (B) includes constitutional unit (II) of general formula (2) below as an essential constitutional unit, and polymer salt (BB) is obtained by further neutralizing polymer (B) with an alkaline substance.

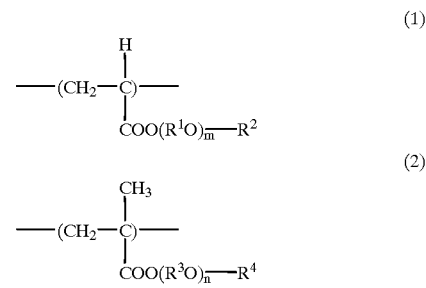

18 Claims, No Drawings

CEMENT ADMIXTURE AND CEMENT COMPOSITION

BACKGROUND OF THE INVENTION

A. Technical Field

The present invention relates to a cement admixture and a cement composition, and more particularly, to a cement admixture and a cement composition, both of which have excellent fluid retainability of cement paste, mortar or concrete at high temperature and further display excellent fluidity even at low temperature.

B. Background Art

Since early deterioration of concrete structures became social problems in 1981, it has been strongly required to improve execution and durability of the concrete structures by decreasing the unit water quantity of concrete. Thus, a lot of technological innovation is carried out to a cement admixture which gives much influence to the quality and the capability of a cement mixture.

As to conventional methods, a fluidizing construction method is carried out, in which raw concrete of low fluidity (hereinafter, the fluidity is referred to as "slump") containing an air entraining (AE) agent or AE water-reducing agent is produced in a plant, and then transported to a building site with a raw concrete car, and then fluidized by adding a fluidizing agent, thereby raising the slump to a predetermined value. However, this construction method, for example, has the following problems: environmental problems due to noises and exhaust gases which are generated when adding the fluidizing agent to the concrete and then stirring and mixing them on the raw concrete car; problems of where the responsibility for the quality of the resultant fluidized concrete is assigned; and problems of great slump-decreasing with time of the fluidized concrete (hereinafter, the "slump-decreasing with time" is referred to as "slump loss").

Thus, a so-called high performance AE water-reducing agent which can be added in a raw concrete plant is energetically developed. However, it is the present condition that there are cases where the slump loss cannot sufficiently be suppressed under hard usage conditions such that the resultant raw concrete is transported to a remote place in summer.

On the other hand, in winter when the temperature is low, the water-reducibility deteriorates, and the required amount of the water-reducing agent added to obtain a predetermined fluidity therefore increases, so there are problems about the quality management of the concrete.

SUMMARY OF THE INVENTION

A. Object of the Invention

It is an object of the present invention to provide a cement admixture and a cement composition, both of which displays little dependence of the water-reducibility upon temperature in that these cement admixture and cement composition involve little slump loss at high temperature and little increase in the amount of addition at low temperature.

B. Disclosure of the Invention

Conventional cement admixtures, comprising a copolymer as obtained by copolymerizing a polyalkylene glycol (meth)acrylate with an unsaturated carboxylic acid, are disclosed in JP-A-08-268741, JP-A-08-053522, JP-A-07-247150, JP-A-06-092703, and JP-A-06-144906. These publications all propose copolymers of which the structures are devised, but none of the cement admixtures as disclosed in these publications is a blend of copolymers.

In recent years, the properties which users demand to cement admixtures are getting various. Therefore, for meeting such various demands, a method in which one copolymer is allowed to possess the various capabilities needs to prepare a lot of copolymers which have capabilities meeting various demands, so it costs high.

Thus, the present inventors thought out using a blend of copolymers which have a single capability respectively, because the use of such a blend could meet various demands from users by changing a mixing ratio. JP-A-09-040446 discloses a cement admixture comprising two polymers each of which is obtained by copolymerizing polyalkylene glycol esters having different polyalkylene glycol chain lengths, wherein the mixing ratio of the polymers is varied. However, both polymers as used therein have a hydroxyl group at a terminal of the polyalkylene glycol chain and therefore easily gelate and involve difficulty in their industrial production. Even if these copolymers could be produced in a laboratory and were used as cement admixtures, a large amount of chain transfer agent to prevent the gelation would need to be added, so the water-reducibility would greatly deteriorate. Therefore, the above conventional cement admixture do not accomplish the above object of the present invention.

The present inventors studied with encouragement to themselves to accomplish the above object of the present invention. As a result, the inventors have completed the present invention by finding that a cement admixture comprising the below-mentioned two polymers could lessen the dependence of the water-reducibility upon temperature, namely, could prevent the slump loss at high temperature and reduce the amount of addition at low temperature, wherein one of the above two polymers is obtained by polymerizing a monomer component which includes a specific monomer as the polyalkylene glycol acrylate, wherein the specific monomer has a hydrocarbon group with 1 to 30 carbon atoms at a terminal of the polyalkylene glycol chain, and wherein the other polymer is obtained by polymerizing a monomer component which includes another specific monomer as the polyalkylene glycol methacrylate, wherein the other specific monomer similarly has a hydrocarbon group with 1 to 30 carbon atoms at a terminal of the polyalkylene glycol chain, and further that because a terminal of each of the above specific monomers is the above hydrocarbon group, the above polymers are both unlikely to gelate.

Thus, a cement admixture, according to the present invention, comprises the following essential components:

either or both of polymer (A) and polymer salt (AA), wherein polymer (A) includes constitutional unit (I) of general formula (1) below as an essential constitutional unit, and polymer salt (AA) is obtained by further neutralizing polymer (A) with an alkaline substance; and either or both of polymer (B) and polymer salt (BB), wherein polymer (B) includes constitutional unit (II) of general formula (2) below as an essential constitutional unit, and polymer salt (BB) is obtained by further neutralizing polymer (B) with an alkaline substance;

wherein general formula (1) is

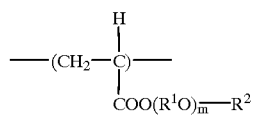
(1)

and general formula (2) is

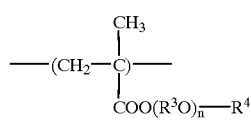
(2)

wherein: each of $R^1O$ and $R^3O$ denotes one kind of oxyalkylene group with 2 to 18 carbon atoms or a mixture of two or more kinds thereof, wherein the mixture may be formed by either block addition or random addition; each of m and n is an average molar number of addition of the oxyalkylene groups and denotes a positive number of 1 or more; and each of $R^2$ and $R^4$ denotes a hydrocarbon group with 1 to 30 carbon atoms.

In the cement admixture as mentioned immediately above, either or both of polymers (A) and (B) preferably further include constitutional unit (III) of general formula (3) below:

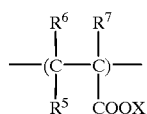
(3)

wherein: $R^5$, $R^6$ and $R^7$, independently of each other, denote a hydrogen atom, a methyl group or a $(CH_2)_pCOOX$ group; X denotes a hydrogen atom, a monovalent metal, a divalent metal, an ammonium group or an organic amine group; and p denotes an integer of 0 to 2; wherein two COOX groups may form an anhydride, if any.

Another cement admixture, according to the present invention, comprises the following essential components:

either or both of polymer (C) and polymer salt (CC), wherein polymer (C) is obtained by polymerizing monomer component (X) including monomer (a) of general formula (4) below as an essential component, and polymer salt (CC) is obtained by further neutralizing polymer (C) with an alkaline substance; and either or both of polymer (D) and polymer salt (DD), wherein polymer (D) is obtained by polymerizing monomer component (Y) including monomer (b) of general formula (5) below as an essential component, and polymer salt (DD) is obtained by further neutralizing polymer (D) with an alkaline substance;

wherein general formula (4) is

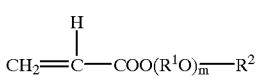
(4)

and general formula (5) is

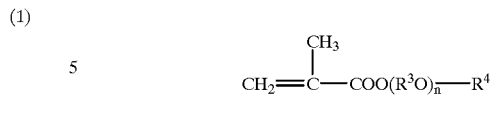
(5)

wherein: each of $R^1O$ and $R^3O$ denotes one kind of oxyalkylene group with 2 to 18 carbon atoms or a mixture of two or more kinds thereof, wherein the mixture may be formed by either block addition or random addition; each of m and n is an average molar number of addition of the oxyalkylene groups and denotes a positive number of 1 or more; and each of $R^2$ and $R^4$ denotes a hydrocarbon group with 1 to 30 carbon atoms.

In the cement admixture as mentioned immediately above, either or both of monomer components (X) and (Y) preferably further include unsaturated carboxylic monomer (c).

A cement composition, according to the present invention, comprises cement, either of the present invention cement admixtures as mentioned above, and water.

These and other objects and the advantages of the present invention will be more fully apparent from the following detailed disclosure.

DETAILED DESCRIPTION OF THE INVENTION

Hereinafter, the cement admixture and the cement composition, according to the present invention, are described in detail.

Cement Admixture

A cement admixture, according to the present invention, comprises the following essential components:

either or both of polymer (A) and polymer salt (AA) which is obtained by further neutralizing polymer (A) with an alkaline substance; and either or both of polymer (B) and polymer salt (BB) which is obtained by further neutralizing polymer (B) with an alkaline substance.

Incidentally, polymer salt (AA) is a salt as obtained by neutralizing an acid group with an alkaline substance when polymer (A) has this acid group, and further, polymer salt (BB) is a salt as obtained by neutralizing an acid group with an alkaline substance when polymer (B) has this acid group.

Polymer (A) is a polymer which includes constitutional unit (I) of general formula (1) above as an essential constitutional unit. Polymer (A) preferably further includes constitutional unit (III) of general formula (3) above as another essential constitutional unit, and may still further include constitutional unit (IV) as derived from monomer (d) below. The content of constitutional unit (III) is preferably 60 weight % or less, more preferably 40 weight % or less, still more preferably 30 weight % or less, and most preferably 25 weight % or less, of polymer (A). Constitutional unit (III) in polymer (A) preferably includes a constitutional unit as derived from the below-mentioned acrylic monomer.

Polymer (B) is a polymer which includes constitutional unit (II) of general formula (2) above as an essential constitutional unit. Polymer (B) preferably further includes constitutional unit (III) of general formula (3) above as another essential constitutional unit, and may still further include constitutional unit (IV) as derived from monomer (d) below. The content of constitutional unit (III) is preferably 60 weight % or less, more preferably 40 weight % or less, still more preferably 30 weight % or less, and most preferably 25 weight % or less, of polymer (B). Constitutional unit (III) in polymer (B) preferably includes a constitutional unit as derived from the below-mentioned acrylic monomer.

It is permissible that: polymer (A) is a polymer which includes constitutional unit (I) only, and polymer (B) is a polymer which includes constitutional unit (II) only. However, it is preferable that: polymer (A) is a polymer which includes constitutional unit (I) only, and polymer (B) is a polymer which includes constitutional units (II) and (III); and further, it is more preferable that: polymer (A) is a polymer which includes constitutional units (I) and (III), and polymer (B) is a polymer which includes constitutional units (II) and (III).

The ratio between the constitutional units composing polymer (A) is not especially limited if polymer (A) includes constitutional unit (I). This ratio is fitly in the range of (1~99)/(1~99)/(0~70) (weight %) as (I)/(III)/(IV), but such a ratio is preferably in the range of (5~99)/(1~60)/(0~50) (weight %), more preferably in the range of (20~98)/(2~40)/(0~40) (weight %), still more preferably in the range of (40~97)/(3~30)/(0~30) (weight %), and most preferably in the range of (45~97)/(3~25)/(0~30) (weight %), wherein the total of constitutional units (I), (III), and (IV) is 100 weight %.

The ratio between the constitutional units composing polymer (B) is not especially limited if polymer (B) includes constitutional unit (II). This ratio is fitly in the range of (1~99)/(1~99)/(0~70) (weight %) as (II)/(III)/(IV), but such a ratio is preferably in the range of (5~99)/(1~60)/(0~50) (weight %), more preferably in the range of (20~98)/(2~40)/(0~40) (weight %), still more preferably in the range of (40~97)/(3~30)/(0~30) (weight %), and most preferably in the range of (45~97)/(3~25)/(0~30) (weight %), wherein the total of constitutional units (II), (III), and (IV) is 100 weight %.

Polymer (A), for example, can be produced by polymerizing a monomer component (e.g. monomer component (X) below) which includes a monomer to give constitutional unit (I) (e.g. monomer (a) below). This monomer component preferably further includes a monomer to give constitutional unit (III) (e.g. monomer (c) below), and may still further include a monomer to give constitutional unit (IV) (e.g. monomer (d) below). Incidentally, polymer (A) may be produced by direct esterification of a polyalkylene glycol upon at least a part of carboxyl groups of a polymer as obtained by polymerizing a monomer component including acrylic acid.

Polymer (B), for example, can be produced by polymerizing a monomer component (e.g. monomer component (Y) below) which includes a monomer to give constitutional unit (II) (e.g. monomer (b) below). This monomer component preferably further includes a monomer to give constitutional unit (III) (e.g. monomer (c) below), and may still further include a monomer to give constitutional unit (IV) (e.g. monomer (d) below). Incidentally, polymer (B) may be produced by direct esterification of a polyalkylene glycol upon at least a part of carboxyl groups of a polymer as obtained by polymerizing a monomer component including methacrylic acid.

Another cement admixture, according to the present invention, comprises the following essential components:
either or both of polymer (C) and polymer salt (CC) which is obtained by further neutralizing polymer (C) with an alkaline substance; and
either or both of polymer (D) and polymer salt (DD) which is obtained by further neutralizing polymer (D) with an alkaline substance.

Incidentally, polymer salt (CC) is a salt as obtained by neutralizing an acid group with an alkaline substance when polymer (C) has this acid group, and further, polymer salt (DD) is a salt as obtained by neutralizing an acid group with an alkaline substance when polymer (D) has this acid group.

Polymer (C) is a polymer which is obtained by polymerizing monomer component (X) including monomer (a) of general formula (4) above. Monomer component (X) preferably further includes the below-mentioned unsaturated carboxylic monomer (c), and may still further include monomer (d) copolymerizable with the preceding monomers. The content of unsaturated carboxylic monomer (c) is preferably 60 weight % or less, more preferably 40 weight % or less, still more preferably 30 weight % or less, and most preferably 25 weight % or less, of monomer component (X). Unsaturated carboxylic monomer (c) in monomer component (X) is preferably a monomer including the below-mentioned acrylic monomer.

Polymer (D) is a polymer which is obtained by polymerizing monomer component (Y) including monomer (b) of general formula (5) above. Monomer component (Y) preferably further includes the below-mentioned unsaturated carboxylic monomer (c), and may still further include monomer (d) copolymerizable with the preceding monomers. The content of unsaturated carboxylic monomer (c) is preferably 60 weight % or less, more preferably 40 weight % or less, still more preferably 30 weight % or less, and most preferably 25 weight % or less, of monomer component (Y). Unsaturated carboxylic monomer (c) in monomer component (Y) is preferably a monomer including the below-mentioned acrylic monomer.

It is permissible that: polymer (C) is a polymer as obtained from monomer component (X) including monomer (a) only, and polymer (D) is a polymer as obtained from monomer component (Y) including monomer (b) only. However, it is preferable that: polymer (C) is a polymer as obtained from monomer component (X) including monomer (a) only, and polymer (D) is a polymer as obtained from monomer component (Y) including monomers (b) and (c); and further, it is more preferable that: polymer (C) is a polymer as obtained from monomer component (X) including monomers (a) and (c), and polymer (D) is a polymer as obtained from monomer component (Y) including monomers (b) and (c).

In general formulae (1), (2), (4), and (5) above, each of $R^1O$ and $R^3O$ denotes one kind of oxyalkylene group with 2 to 18 carbon atoms or a mixture of two or more kinds thereof, wherein the mixture may be formed by either block addition or random addition; and each of m and n is an average molar number of addition of the oxyalkylene groups and denotes a positive number of 1 or more.

Each of $R^2$ and $R^4$ denotes a hydrocarbon group with 1 to 30 carbon atoms, and is, for example, as follows: an alkyl group with 1 to 30 carbon atoms; an aromatic group with 6 to 30 carbon atoms having a benzene ring, such as a phenyl group, an alkylphenyl group, a phenylalkyl group, a phenyl group with an (alkyl)phenyl substituent, or naphthyl group; or an alkenyl group with 2 to 30 carbon atoms. Among them, either or both of the alkyl group with 1 to 30 carbon atoms and the alkenyl group with 2 to 30 carbon atoms are preferable. Incidentally, it is unfavorable to use a monomer in which the above hydrocarbon group is replaced with a hydrogen atom, because such a monomer forms a crosslinking structure to easily become gelated and therefore involves difficulty of the polymerization reaction.

Monomer (a) of general formula (4), used in the present invention, is an ester compound of an alkoxy(poly)alkylene glycol with acrylic acid wherein the alkoxy(poly)alkylene glycol is obtained by adding an alkylene oxide with 2 to 18 carbon atoms to any one of the following alcohols: saturated aliphatic alcohols with 1 to 30 carbon atoms, such as methanol, ethanol, 2-propanol, 1-butanol, octanol, 2-ethyl-1-hexanol, nonyl alcohol, lauryl alcohol, cetyl alcohol, and stearyl alcohol; unsaturated aliphatic alcohols with 2 to 30 carbon atoms, such as allyl alcohol, methallyl alcohol, crotyl alcohol, and oleyl alcohol; alicyclic alcohols with 3 to 30 carbon atoms, such as cyclohexanol; and aromatic alcohols with 6 to 30 carbon atoms, such as phenol, phenylmethanol (benzyl alcohol), methylphenol(cresol), p-ethylphenol, dimethylphenol(xylenol), p-t-butylphenol, nonylphenol, dodecylphenol, phenylphenol, and naphthol.

Concrete examples of monomer (a) include: various kinds of alkoxy(poly)ethylene glycol monoacrylates such as methoxy(poly)ethylene glycol monoacrylate, ethoxy(poly)ethylene glycol monoacrylate, 1-propoxy(poly)ethylene glycol monoacrylate, 2-propoxy(poly)ethylene glycol monoacrylate, 1-butoxy(poly)ethylene glycol monoacrylate, 2-butoxy(poly)ethylene glycol monoacrylate, 2-methyl-1-propoxy(poly)ethylene glycol monoacrylate, 2-methyl-2-propoxy(poly)ethylene glycol monoacrylate, cyclohexoxy(poly)ethylene glycol monoacrylate, 1-octoxy(poly)ethylene glycol monoacrylate, 2-ethyl-1-hexanoxy(poly)ethylene glycol monoacrylate, nonyl alkoxy(poly)ethylene glycol monoacrylate, lauryl alkoxy(poly)ethylene glycol monoacrylate, cetyl alkoxy(poly)ethylene glycol monoacrylate, stearyl alkoxy(poly)ethylene glycol monoacrylate, phenoxy(poly)ethylene glycol monoacrylate, phenylmethoxy(poly)ethylene glycol monoacrylate, methylphenoxy(poly)ethylene glycol monoacrylate, p-ethylphenoxy(poly)ethylene glycol monoacrylate, dimethylphenoxy(poly)ethylene glycol monoacrylate, p-t-butylphenoxy(poly)ethylene glycol monoacrylate, nonylphenoxy(poly)ethylene glycol monoacrylate, nonylphenoxy(poly)ethylene glycol monoacrylate, dodecylphenoxy(poly)ethylene glycol monoacrylate, phenylphenoxy(poly)ethylene glycol monoacrylate, naphthoxy(poly)ethylene glycol monoacrylate, ester compounds of ethylene-oxide-added allyl alcohol with acrylic acid, ester compounds of ethylene-oxide-added methallyl alcohol with acrylic acid, and ester compounds of ethylene-oxide-added crotyl alcohol with acrylic acid; various kinds of alkoxy(poly)propylene glycol monoacrylates such as methoxy(poly)propylene glycol monoacrylate, ethoxy(poly)propylene glycol monoacrylate, 1-propoxy(poly)propylene glycol monoacrylate, 2-propoxy(poly)propylene glycol monoacrylate, 1-butoxy(poly)propylene glycol monoacrylate, 2-butoxy(poly)propylene glycol monoacrylate, 2-methyl-1-propoxy(poly)propylene glycol monoacrylate, 2-methyl-2-propoxy(poly)propylene glycol monoacrylate, cyclohexoxy(poly)propylene glycol monoacrylate, 1-octoxy(poly)propylene glycol monoacrylate, 2-ethyl-1-hexanoxy(poly)propylene glycol monoacrylate, nonyl alkoxy(poly)propylene glycol monoacrylate, lauryl alkoxy(poly)propylene glycol monoacrylate, cetyl alkoxy(poly)propylene glycol monoacrylate, stearyl alkoxy(poly)propylene glycol monoacrylate, phenoxy(poly)propylene glycol monoacrylate, phenylmethoxy(poly)propylene glycol monoacrylate, methylphenoxy(poly)propylene glycol monoacrylate, p-ethylphenoxy(poly)propylene glycol monoacrylate, dimethylphenoxy(poly)propylene glycol monoacrylate, p-t-butylphenoxy(poly)propylene glycol monoacrylate, nonylphenoxy(poly)propylene glycol monoacrylate, dodecylphenoxy(poly)propylene glycol monoacrylate, phenylphenoxy(poly)propylene glycol monoacrylate, naphthoxy(poly)propylene glycol monoacrylate, ester compounds of propylene-oxide-added allyl alcohol with acrylic acid, ester compounds of propylene-oxide-added methallyl alcohol with acrylic acid, and ester compounds of propylene-oxide-added crotyl alcohol with acrylic add; and various kinds of alkoxy(poly)butylene glycol monoacrylates such as methoxy(poly)butylene glycol monoacrylate, ethoxy(poly)butylene glycol monoacrylate, 1-propoxy(poly)butylene glycol monoacrylate, 2-propoxy(poly)butylene glycol monoacrylate, 1-butoxy(poly)butylene glycol monoacrylate, 2-butoxy(poly)butylene glycol monoacrylate, 2-methyl-1-propoxy(poly)butylene glycol monoacrylate, 2-methyl-2-propoxy(poly)butylene glycol monoacrylate, cyclohexoxy(poly)butylene glycol monoacrylate, 1-octoxy(poly)butylene glycol monoacrylate, 2-ethyl-1-hexanoxy(poly)butylene glycol monoacrylate, nonyl alkoxy(poly)butylene glycol monoacrylate, lauryl alkoxy(poly)butylene glycol monoacrylate, cetyl alkoxy(poly)butylene glycol monoacrylate, stearyl alkoxy(poly)butylene glycol monoacrylate, phenoxy(poly)butylene glycol monoacrylate, phenylmethoxy(poly)butylene glycol monoacrylate, methylphenoxy(poly)butylene glycol monoacrylate, p-ethylphenoxy(poly)butylene glycol monoacrylate, dimethylphenoxy(poly)butylene glycol monoacrylate, p-t-butylphenoxy(poly)butylene glycol monoacrylate, nonylphenoxy(poly)butylene glycol monoacrylate, dodecylphenoxy(poly)butylene glycol monoacrylate, phenylphenoxy(poly)butylene glycol monoacrylate, naphthoxy(poly)butylene glycol monoacrylate, ester compounds of butylene-oxide-added allyl alcohol with acrylic acid, ester compounds of butylene-oxide-added methallyl alcohol with acrylic acid, and ester compounds of butylene-oxide-added crotyl alcohol with acrylic acid; and various kinds of alkoxypolyalkylene glycol monoacrylates such as ester compounds of acrylic acid with adducts of two or more alkylene oxides to alcohols, for example, methoxypolyethylene glycol polypropylene glycol monoacrylate, methoxypolyethylene glycol polybutylene glycol monoacrylate, methoxypolyethylene glycol polystyrene glycol monoacrylate. Incidentally, monomers (a) may be used in combinations with each other.

The average molar number, m, of addition of the oxyalkylene groups in monomer (a) and constitutional unit (I) is a positive number of 1 or more. However, as this average molar number of addition decreases, the hydrophilicity falls, while as this average molar number of addition increases, the reactivity falls. Thus, the average molar number of addition is preferably a positive number of 1 to 500, more preferably 2 to 500, still more preferably 2 to 300, particularly preferably 10 to 300, and most preferably 15 to 300.

The number of the carbon atoms of the oxyalkylene group $R^1O$ in monomer (a) and constitutional unit (I) is fitly in the range of 2 to 18, but is preferably in the range of 2 to 8 and more preferably in the range of 2 to 4. Also, as for adducts of any two or more alkylene oxides selected from the group consisting of ethylene oxide, propylene oxide, butylene oxide and styrene oxide, any of random addition, block addition, alternating addition and so on can be used.

When only one monomer (a) is used, it is preferable for obtaining the hydrophilicity-hydrophobicity balance that an oxyethylene group is included in the oxyalkylene groups as an essential component, and further that the oxyethylene group comprises 50 mol % or more of the oxyalkylene groups.

Monomer (b) of general formula (5), used in the present invention, is an ester compound of an alkoxy(poly)alkylene glycol with methacrylic acid wherein the alkoxy(poly)alkylene glycol is obtained by adding an alkylene oxide with 2 to 18 carbon atoms to any one of the following alcohols: saturated aliphatic alcohols with 1 to 30 carbon atoms, such as methanol, ethanol, 2-propanol, 1-butanol, octanol, 2-ethyl-1-hexanol, nonyl alcohol, lauryl alcohol, cetyl alcohol, and stearyl alcohol; unsaturated aliphatic alcohols with 2 to 30 carbon atoms, such as allyl alcohol, methallyl alcohol, crotyl alcohol, and oleyl alcohol; alicyclic alcohols with 3 to 30 carbon atoms, such as cyclohexanol; and aromatic alcohols with 6 to 30 carbon atoms, such as phenol, phenylmethanol (benzyl alcohol), methylphenol(cresol), p-ethylphenol, dimethylphenol (xylenol), p-t-butylphenol, nonylphenol, dodecylphenol, phenylphenol, and naphthol.

Concrete examples of monomer (b) include: various kinds of alkoxy(poly)ethylene glycol monomethacrylates such as methoxy(poly)ethylene glycol monomethacrylate, ethoxy(poly)ethylene glycol monomethacrylate, 1-propoxy(poly)ethylene glycol monomethacrylate, 2-propoxy(poly)ethylene glycol monomethacrylate, 1-butoxy(poly)ethylene glycol monomethacrylate, 2-butoxy(poly)ethylene glycol monomethacrylate, 2-methyl-1-propoxy(poly)ethylene glycol monomethacrylate, 2-methyl-2-propoxy(poly)ethylene glycol monomethacrylate, cyclohexoxy(poly)ethylene glycol monomethacrylate, 1-octoxy(poly)ethylene glycol monomethacrylate, 2-ethyl-1-hexanoxy(poly)ethylene glycol monomethacrylate, nonyl alkoxy(poly)ethylene glycol monomethacrylate, lauryl alkoxy(poly)ethylene glycol monomethacrylate, cetyl alkoxy(poly)ethylene glycol monomethacrylate, stearyl alkoxy(poly)ethylene glycol monomethacrylate, phenoxy(poly)ethylene glycol monomethacrylate, phenylmethoxy(poly)ethylene glycol monomethacrylate, methylphenoxy(poly)ethylene glycol monomethacrylate, p-ethylphenoxy(poly)ethylene glycol monomethacrylate, dimethylphenoxy(poly)ethylene glycol monomethacrylate, p-t-butylphenoxy(poly)ethylene glycol monomethacrylate, nonylphenoxy(poly)ethylene glycol monomethacrylate, dodecylphenoxy(poly)ethylene glycol monomethacrylate, phenylphenoxy(poly)ethylene glycol monomethacrylate, naphthoxy(poly)ethylene glycol monomethacrylate, ester compounds of ethylene-oxide-added allyl alcohol with methacrylic acid, ester compounds of ethylene-oxide-added methallyl alcohol with methacrylic acid, and ester compounds of ethylene-oxide-added crotyl alcohol with methacrylic acid; various kinds of alkoxy(poly)propylene glycol monomethacrylates such as methoxy(poly)propylene glycol monomethacrylate, ethoxy(poly)propylene glycol monomethacrylate, 1-propoxy(poly)propylene glycol monomethacrylate, 2-propoxy(poly)propylene glycol monomethacrylate, 1-butoxy(poly)propylene glycol monomethacrylate, 2-butoxy(poly)propylene glycol monomethacrylate, 2-methyl-1-propoxy(poly)propylene glycol monomethacrylate, 2-methyl-2-propoxy(poly)propylene glycol monomethacrylate, cyclohexoxy(poly)propylene glycol monomethacrylate, 1-octoxy(poly)propylene glycol monomethacrylate, 2-ethyl-1-hexanoxy(poly)propylene glycol monomethacrylate, nonyl alkoxy(poly)propylene glycol monomethacrylate, lauryl alkoxy(poly)propylene glycol monomethacrylate, cetyl alkoxy(poly)propylene glycol monomethacrylate, stearyl alkoxy(poly)propylene glycol monomethacrylate, phenoxy(poly)propylene glycol monomethacrylate, phenylmethoxy(poly)propylene glycol monomethacrylate, methylphenoxy(poly)propylene glycol monomethacrylate, p-ethylphenoxy(poly)propylene glycol monomethacrylate, dimethylphenoxy(poly)propylene glycol monomethacrylate, p-t-butylphenoxy(poly)propylene glycol monomethacrylate, nonylphenoxy(poly)propylene glycol monomethacrylate, dodecylphenoxy(poly)propylene glycol monomethacrylate, phenylphenoxy(poly)propylene glycol monomethacrylate, naphthoxy(poly)propylene glycol monomethacrylate, ester compounds of propylene-oxide-added allyl alcohol with methacrylic acid, ester compounds of propylene-oxide-added methallyl alcohol with methacrylic acid, and ester compounds of propylene-oxide-added crotyl alcohol with methacrylic acid; and various kinds of alkoxy(poly)butylene glycol monomethacrylates such as methoxy(poly)butylene glycol monomethacrylate, ethoxy(poly)butylene glycol monomethacrylate, 1-propoxy(poly)butylene glycol monomethacrylate, 2-propoxy(poly)butylene glycol monomethacrylate, 1-butoxy(poly)butylene glycol monomethacrylate, 2-butoxy(poly)butylene glycol monomethacrylate, 2-methyl-1-propoxy(poly)butylene glycol monomethacrylate, 2-methyl-2-propoxy(poly)butylene glycol monomethacrylate, cyclohexoxy(poly)butylene glycol monomethacrylate, 1-octoxy(poly)butylene glycol monomethacrylate, 2-ethyl-1-hexanoxy(poly)butylene glycol monomethacrylate, nonyl alkoxy(poly)butylene glycol monomethacrylate, lauryl alkoxy(poly)butylene glycol monomethacrylate, cetyl alkoxy(poly)butylene glycol monomethacrylate, stearyl alkoxy(poly)butylene glycol monomethacrylate, phenoxy(poly)butylene glycol monomethacrylate, phenylmethoxy(poly)butylene glycol monomethacrylate, methylphenoxy(poly)butylene glycol monomethacrylate, p-ethylphenoxy(poly)butylene glycol monomethacrylate, dimethylphenoxy(poly)butylene glycol monomethacrylate, p-t-butylphenoxy(poly)butylene glycol monomethacrylate, nonylphenoxy(poly)butylene glycol monomethacrylate, dodecylphenoxy(poly)butylene glycol monomethacrylate, phenylphenoxy(poly)butylene glycol monomethacrylate, naphthoxy(poly)butylene glycol monomethacrylate, ester compounds of butylene-oxide-added allyl alcohol with methacrylic acid, ester compounds of butylene-oxide-added methallyl alcohol with methacrylic acid, and ester compounds of butylene-oxide-added crotyl alcohol with methacrylic acid; and various kinds of alkoxypolyalkylene glycol monomethacrylates such as ester compounds of methacrylic acid with adducts of two or more alkylene oxides to alcohols, for example, methoxypolyethylene glycol polypropylene glycol monomethacrylate, methoxypolyethylene glycol polybutylene glycol monomethacrylate, methoxypolyethylene glycol polystyrene glycol monomethacrylate. Incidentally, monomers (b) may be used in combinations with each other.

The average molar number, n, of addition of the oxyalkylene groups in monomer (b) and constitutional unit (II) is a positive number of 1 or more. However, as this average molar number of addition decreases, the hydrophilicity falls, while as this average molar number of addition increases, the reactivity falls. Thus, the average molar number of addition is preferably a positive number of 1 to 500, more preferably 2 to 500, still more preferably 2 to 300, particularly preferably 10 to 300, and most preferably 15 to 300.

The number of the carbon atoms of the oxyalkylene group $R^3O$ in monomer (b) and constitutional unit (II) is fitly in the range of 2 to 18, but is preferably in the range of 2 to 8 and more preferably in the range of 2 to 4. Also, as for adducts of any two or more alkylene oxides selected from the group consisting of ethylene oxide, propylene oxide, butylene oxide and styrene oxide, any of random addition, block addition, alternating addition and so on can be used.

When only one monomer (b) is used, it is preferable for obtaining the hydrophilicity-hydrophobicity balance that an oxyethylene group is included in the oxyalkylene groups as an essential component, and further that the oxyethylene group comprises 50 mol % or more of the oxyalkylene groups.

There is no especial limitation in the relations between the average molar numbers, m and n, of addition of the oxyalkylene groups in monomer (a) and constitutional unit (I) and in monomer (b) and constitutional unit (II) respectively. Accordingly, it is not necessary that one of these two pairs of monomer and constitutional unit has an oxyalkylene chain with a short chain length of 10~30 mols of oxyalkylene groups, and that the other has an oxyalkylene chain with a long chain length of 100~300 mols of oxyalkylene groups. Thus, it is preferable that both pairs have an oxyalkylene chain with a short chain length of 10~30 mols of oxyalkylene groups or with a medium chain length of 30~100 mols of oxyalkylene groups or with a long chain length of 100~300 mols of oxyalkylene groups, and further it is also preferable that both pairs have an oxyalkylene chain with a medium or short chain length of 10~100 mols of oxyalkylene groups or with a medium or long chain length of 30~300 mols of oxyalkylene groups.

Unsaturated carboxylic monomer (c), used in the present invention, is an unsaturated monomer having a carboxyl group and is a monomer of general formula (6) below.

General Formula (6):

(6)

wherein: $R^5$, $R^6$ and $R^7$, independently of each other, denote a hydrogen atom, a methyl group or a $(CH_2)_p COOX$ group; X denotes a hydrogen atom, a monovalent metal, a divalent metal, an ammonium group or an organic amine group; and p denotes an integer of 0 to 2; wherein two COOX groups may form an anhydride, if any.

Concrete examples of unsaturated carboxylic monomer (c), used in the present invention, include: acrylic monomers, such as acrylic acid, methacrylic acid, and crotonic acid, and their metal salts, ammonium salts, and amine salts; unsaturated dicarboxylic monomers, such as maleic acid, itaconic acid, citraconic acid, and fumaric acid, or their metal salts, ammonium salts, and amine salts; and further their anhydrides such as maleic anhydride, itaconic anhydride and citraconic anhydride. Among these, the acrylic monomers are preferable. Incidentally, monomers (c) may be used in combinations with each other.

In addition, from the standpoint of the preparation of the starting materials and the copolymerizability, it is preferable that: monomer component (X) includes monomer (a) and monomer (c) such as acrylic acid and its metal salts, ammonium salts, and amine salts, and that monomer component (Y) includes monomer (b) and monomer (c) such as methacrylic acid and its metal salts, ammonium salts, and amine salts.

Furthermore, monomer component (X) or (Y), which is used as a starting material of polymer (C) or (D) respectively, may further include another copolymerizable monomer (d) which does not damage the effects of the present invention.

Specific examples of monomer (d) include: half esters and diesters of unsaturated dicarboxylic acids, such as maleic acid, fumaric acid, itaconic acid, and citraconic acid, with alcohols having 1 to 30 carbon atoms; half amides and diamides of the above-mentioned unsaturated dicarboxylic acids with amines having 1 to 30 carbon atoms; half esters and diesters of the above-mentioned unsaturated dicarboxylic acids with alkyl (poly)alkylene glycols as obtained by adding 1 to 500 mols of alkylene oxides with 2 to 18 carbon atoms to the above-mentioned alcohols or amines; half esters and diesters of the above-mentioned unsaturated dicarboxylic acids with glycols having 2 to 18 carbon atoms or with polyalkylene glycols of 2 to 500 in molar number of addition of the foregoing glycols; adducts of 1 to 500 mols of alkylene oxides with 2 to 18 carbon atoms to dehydrogenation (oxidation) products of acrylic acid, methacrylic acid or fatty acids, such as (poly)ethylene glycol mono(meth)acrylate, (poly)propylene glycol mono(meth)acrylate and (poly)butylene glycol mono(meth)acrylate; half amides of maleamic acid with glycols having 2 to 18 carbon atoms or polyalkylene glycols of 2 to 500 in molar number of addition of the foregoing glycols; (poly)alkylene glycol di(meth)acrylates such as triethylene glycol di(meth)acrylate, (poly)ethylene glycol di(meth)acrylate, polypropylene glycol di(meth)acrylate, and (poly)ethylene glycol (poly)propylene glycol di(meth)acrylate; difunctional (meth)acrylates such as hexanediol di(meth)acrylate, trimethylolpropane tri(meth)acrylate, and trimethylolpropane di(meth)acrylate; (poly)alkylene glycol dimaleates such as triethylene glycol dimaleate and polyethylene glycol dimaleate; unsaturated sulfonic acids, such as vinylsulfonate, (meth)allylsulfonate, 2-(meth)acryloxyethylsulfonate, 3-(meth)acryloxypropylsulfonate, 3-(meth)acryloxy- 2-hydroxypropylsulfonate, 3-(meth)acryloxy-2-hydroxypropylsulfophenyl ether, 3-(meth)acryloxy-2-hydroxypropyloxysulfobenzoate, 4-(meth)acryloxybutylsulfonate, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; esters of (meth)acrylic acid with alcohols having 1 to 30 carbon atoms, such as methyl (meth)acrylate, ethyl (meth)acrylate, propyl (meth)acrylate, butyl (meth)acrylate, 2-ethylhexyl (meth)acrylate, 2-hydroxyethyl (meth)acrylate, hydroxypropyl (meth)acrylate, hydroxybutyl (meth)acrylate, methyl crotonate, and glycidyl (meth)acrylate; amides of unsaturated monocarboxylic acids with amines having 1 to 30 carbon atoms, such as methyl(meth)acrylamide; vinyl aromatic compounds such as styrene, α-methylstyrene, vinyltoluene, and p-methylstyrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth)acrylamide, (meth)acrylalkylamide, N-methylol(meth)acrylamide, and N,N-dimethyl(meth)acrylamide; unsaturated cyanes such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth)allyl alcohol and glycidyl (meth)allyl ether; unsaturated amino compounds such as dimethylaminoethyl (meth)acrylate; vinyl ethers or allyl ethers, such as methoxypolyethylene glycol monovinyl ether, polyethylene glycol monovinyl ether, methoxypolyethylene glycol mono(meth)allyl ether, and polyethylene glycol mono(meth)allyl ether; and siloxane derivatives such as polydimethylsiloxanepropylaminomaleamic acid, polydimethylsiloxaneaminopropyleneaminomaleamic acid, polydimethylsiloxanebis(propylaminomaleamic acid), polydimethylsiloxanebis(dipropyleneaminomaleamic acid), polydimethylsiloxane-(1-propyl-3-acrylate), polydimethylsiloxane-(1-propyl-3-methacrylate), polydimethylsiloxanebis(1-propyl-3-acrylate), and polydimethylsiloxanebis(1-propyl-3-methacrylate). These may be used either alone respectively or in combinations of two or more thereof.

Polymer (C) is obtained by polymerizing monomer component (X) including monomer (a), wherein monomer component (X) preferably further includes monomer (c) and may still further include monomer (d). The ratio between these monomers is fitly in the range of (1~99)/(1~99)/(0~70) (weight %) as (a)/(c)/(d), but such a ratio is preferably in the range of (5~99)/(1~60)/(0~50) (weight %), more preferably in the range of (20~98)/(2~40)/(0~40) (weight %), still more preferably in the range of (40~97)/(3~30)/(0~30) (weight %), and most preferably in the range of (45~97)/(3~25)/(0~30) (weight %), wherein the sum of monomers (a), (c), and (d) is 100 weight %.

Polymer (C) is, for example, obtainable by polymerizing the above monomer component using a polymerization initiator. The polymerization can be carried out by methods such as polymerization in a solvent and bulk polymerization.

The polymerization in a solvent can be carried in either a batch manner or a continuous manner. Examples of the solvent used then include: water; lower alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; and ketone compounds such as acetone and methyl ethyl ketone. Considering the solubilities of the starting monomers and the resultant polymer (C) as well as the convenience of using this polymer (C), it is preferable to use at least one kind selected from the group consisting of water and lower alcohols with 1 to 4 carbon atoms. In this case, for example, methyl alcohol, ethyl alcohol, and isopropyl alcohol are particularly effective among the lower alcohols with 1 to 4 carbon atoms.

Water-soluble polymerization initiators such as persulfates of ammonium and alkaline metals and hydrogen peroxide are, for example, used as initiators for polymerization in a water medium. In such a case, promotors, such as sodium hydrogen sulfite and Mohr's salt, can be jointly used. In addition, for example, peroxides such as benzoyl peroxide and lauroyl peroxide, hydroperoxides such as cumene hydroperoxide, and aromatic azo compounds such as azobisisobutyronitrile may be used as initiators for polymerization in the following above-mentioned solvents: lower alcohols, aromatic hydrocarbons, aliphatic hydrocarbons, ester compounds and ketone compounds. In such a case, promotors such as amine compounds can be jointly used. Furthermore, fit selections from among the above polymerization initiators or from among combinations thereof with the promoters are available for polymerization in water-lower-alcohol mixed solvents. The polymerization temperature is fitly determined by the solvent used or by the polymerization initiator, but is usually in the range of 0~120° C.

The bulk polymerization is, for example, carried out in the temperature range of 50~200° C. using the following polymerization initiators: peroxides such as benzoyl peroxide and lauroyl peroxide; hydroperoxides such as cumene hydroperoxide; and aliphatic azo compounds such as azobisisobutyronitrile.

In addition, a thiol chain transfer agent may be jointly used to adjust the molecular weight of the resultant polymer (C). The thiol transfer agent is represent by a general formula:

wherein: $R^{10}$ denotes an alkyl group with 1 to 2 carbon atoms; E denotes a —OH, —COOM, —COOR$^{11}$ or SO$_3$M group; M denotes hydrogen, a monovalent metal, a divalent metal, an ammonium group or an organic amine group; $R^{11}$ denotes an alkyl group with 1 to 10 carbon atoms; and g denotes an integer of 1 to 2. Examples of the thiol chain transfer agent include: mercaptoethanol, thioglycerol, thioglycolic acid, 2-mercaptopropionic acid, 3- mercaptopropionic acid, thiomalic acid, octyl thioglycolate, and octyl 3- mercaptopropionate. These may be used either alone respectively or in combinations of two or more thereof.

Polymer (C), obtained in the above way, or polymer (A) may be used as the main component of the cement admixture as it is. However, polymer salt (CC or AA), obtained by further neutralizing polymer (C or A) with an alkaline substance, may be used as the main component of the cement admixture, if necessary. Preferable examples of such an alkaline substance include: inorganic substances such as hydroxides, chlorides and carbonates of mono- and divalent metals; ammonia; and inorganic amines.

Polymer (D) is obtained by polymerizing monomer component (Y) including monomer (b), wherein monomer component (Y) preferably further includes monomer (c) and may still further include monomer (d). The ratio between these monomers is fitly in the range of (1~99)/(1~99)/(0~70) (weight %) as (b)/(c)/(d), but such a ratio is preferably in the range of (5~99)/(1~60)/(0~50) (weight %), more preferably in the range of (20~98)/(2~40)/(0~40) (weight %), still more preferably in the range of (40~97)/(3~30)/(0~30) (weight %), and most preferably in the range of (45~97)/(3~25)/(0~30) (weight %), wherein the sum of monomers (b), (c), and (d) is 100 weight %.

Polymer (D) and polymer salt (DD) above can also be prepared by the same method as that for polymer (C) and polymer salt (CC) above.

The weight ratio of polymer (salt) (A and/or AA) to polymer (salt) (B and/or BB) and the weight ratio of polymer (salt) (C and/or CC) to polymer (salt) (D and/or DD) are both in the range of 1:99~99:1, preferably 3:97~97:3, more preferably 10:90~90:10, still more preferably 20:80~80:20.

Furthermore, the average value between the content (weight %) of constitutional unit (III) in polymer (A) and the content (weight %) of constitutional unit (III) in polymer (B), and the average value between the content (weight %) of monomer (c) in monomer component (X) as used to produce polymer (C) and the content (weight %) of monomer (c) in monomer component (Y) as used to produce polymer (D), are both preferably in the range of 1~60 weight %, more preferably 2~40 weight %, still more preferably 3~30 weight. %, and most preferably 4~25 weight %.

In addition, the respective weight-average molecular weights of polymer (A), polymer (B), polymer salt (AA), polymer salt (BB), polymer (C), polymer (D), polymer salt (CC), polymer salt (DD), which are used as the cement admixture of the present invention, are preferably in the range of 500~500,000, more preferably, 5,000~300,000. The weight-average molecular weight of less than 500 is unpreferable because the water-reducibility of the cement admixture falls. On the other hand, the weight-average molecular weight exceeding 500,000 is unpreferable because the water-reducibility and the slump loss preventability of the cement admixture fall.

Cement Composition

The cement composition, according to the present invention, comprises cement, the above present invention cement admixture, and water, and is, for example, used as cement paste, mortar, or concrete.

Examples of the cement, usable in the present invention, include hydraulic cements, such as portland cement, belite high-content cement, alumina cement and various mixed cement, or hydraulic materials such as gypsum.

The ratio of the cement admixture, as combined in the present invention cement composition, is not especially limited, but when the cement admixture is, for example, used for mortar or concrete containing the hydraulic cement, the amount of the cement admixture is usually in the range of 0.01~4.0%, preferably 0.02~2.0%, more preferably 0.05~1.0%, of the cement weight. The addition in such an amount when kneading brings about favorable effects such as achievement of high water-reducing ratio, enhancement of slump loss preventability, reduction of unit water amount, increase of strength, and enhancement of durability. The above ratio of combination smaller than 0.01% is insufficient to the performance. Or otherwise, even if a large amount exceeding 4.0% is used, the resultant effects substantially reach the top and do not increase any more, so there are economical disadvantages.

The cement composition of the present invention is not limited with regard to the cement usage amount and the unit water amount per 1 m$^3$ of the above cement composition. However, the unit water amount of 100~185 kg/m$^3$ and the water/cement weight ratio of 0.10~0.7 are recommended, and the unit water amount of 120~175 kg/m$^3$ and the water/cement weight ratio of 0.2~0.65 are preferably recommended. The cement composition may further contain aggregates such as sand and ballast, if necessary.

The cement composition of the present invention may further comprise conventional cement dispersants.

Examples of the conventional cement dispersants include: ligninsulfonic acid salts; polyol derivatives; naphthalenesulfonic acid-formalin condensation products; melaminesulfonic acid-formalin condensation products; polystyrenesulfonic acid salts; aminosulfonic compounds, such as aminoarylsulfonic acid-phenol-formaldehyde condensation products as disclosed in JP-A-01-113419; and polycarboxylic acids (or salts thereof) such as: cement dispersants, as disclosed in JP-A-07-267705, comprising (a) copolymers and/or salts thereof, as formed from polyalkylene glycol mono(meth)acrylate compounds and (meth)acrylic compounds, (b) copolymers and/or their hydrolyzed products and/or salts, as formed from polyalkylene glycol mono (meth)allyl ether compounds and maleic anhydride, and (c) copolymers and/or salts thereof, as formed from polyalkylene glycol mono(meth)allyl ether compounds and polyalkylene glycol maleates; admixtures for concrete, as disclosed in Japanese Patent No. 2508113, comprising (A) copolymers as formed from polyalkylene glycol (meth)acrylates and (meth)acrylic acid (or salts thereof), (B) specific polyethylene glycol polypropylene glycol compounds, and (C) specific surfactants; copolymers as disclosed in JP-A-62-216950 and formed from either polyethylene(propylene) glycol (meth)acrylate or polyethylene(propylene)glycol mono(meth)allyl ether, and (meth)allylsulfonic acid (or salts thereof) and (meth)acrylic acid (or salts thereof); copolymers as disclosed in JP-A-01-226757 and formed from polyethylene(propylene)glycol (meth)acrylate, (meth)allylsulfonic acid (or salts thereof), and (meth)acrylic acid (or salts thereof); copolymers as disclosed in JP-B-05-036377 and formed from polyethylene(propylene)glycol (meth)acrylate, either (meth)allylsulfonic acid (or salts thereof) or p-(meth)allyloxybenzenesulfonic acid (or salts thereof), and (meth)acrylic acid (or salts thereof); copolymers as disclosed in JP-A-04-149056 and formed from polyethylene glycol mono(meth)allyl ether and maleic acid (or salts thereof); copolymers as disclosed in JP-A-05-170501 and formed from polyethylene glycol (meth) acrylate, (meth)allylsulfonic acid (or salts thereof), (meth) acrylic acid (or salts thereof), alkanediol mono(meth) acrylate, polyalkylene glycol mono(meth)acrylate, and α,β-unsaturated monomers with an amide group in their molecules; copolymers as disclosed in JP-A-06-191918 and formed from polyethylene glycol mono(meth)allyl ether, polyethylene glycol mono(meth)acrylate, alkyl (meth) acrylates, (meth)acrylic acid (or salts thereof), and either (meth)allylsulfonic acid (or salts thereof) or p-(meth) allyloxybenzenesulfonic acid (or salts thereof); copolymers or their hydrolyzed products or salts, as disclosed in JP-A-05-043288 and formed from alkoxypolyalkylene glycol monoallyl ether and maleic anhydride; copolymers or their salts or esters, as disclosed in JP-B-58-038380 and formed from polyethylene glycol monoallyl ether, maleic acid, and monomers copolymerizable with these monomers; copolymers as disclosed in JP-B-59-018338 and formed from polyalkylene glycol mono(meth)acrylate monomers, (meth) acrylic monomers, and monomers copolymerizable with these monomers; copolymers or salts thereof, as disclosed in JP-A-62-119147 and formed from (meth)acrylic esters with a sulfonic acid group and, in case of need, monomers copolymerizable therewith; esterification products as disclosed in JP-A-06-271347 and formed from copolymers of alkoxypolyalkylene glycol monoallyl ether with maleic anhydride and from polyoxyalkylene derivatives having a terminal alkenyl group; esterification products as disclosed in JP-A-06-298555 and formed from copolymers of alkoxypolyalkylene glycol monoallyl ether with maleic anhydride and from polyoxyalkylene derivatives having a terminal hydroxyl group; and copolymers or salts thereof, as disclosed in JP-A-62-068806 and formed from alkenyl ether monomers (adducts of ethylene oxide to specific unsaturated alcohols such as 3-methyl-3-buten-1-ol), unsaturated carboxylic monomers, and monomers copolymerizable therewith. These conventional cement dispersants can be jointly used in plural.

When the cement composition of the present invention further includes the above conventional cement dispersant, the combination ratio of the conventional cement dispersant depends upon factors such as the sort of the conventional cement dispersant, the way to combine the conventional cement dispersant, and the test conditions and therefore cannot be determined in a wholesale manner. However, the weight ratio of the present invention cement admixture to the conventional cement dispersant is usually in the range of (5~95):(95~5), preferably in the range of (10~90):(90~10).

Furthermore, the cement composition of the present invention may contain other conventional cement additives (materials to add to cement) (1)~(20) as exemplified below:

(1) water-soluble high-molecular substances, for example: unsaturated carboxylic acid polymers such as polyacrylic acid (or its sodium salt), polymethacrylic acid (or its sodium salt), polymaleic acid (or its sodium salt), and sodium salt of acrylic acid-maleic acid copolymer; polymers or copolymers of polyoxyethylene or polyoxypropylene such as polyethylene glycol and polypropylene glycol; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharides produced by microbiological fermentation such as yeast glucan, xanthane gum, and β-1.3 glucans (which may be either a linear or branched chain type and of which examples include curdlan, paramylon, vacciman, scleroglucan and laminaran); polyacrylamide; polyvinyl alcohol; starch; starch phosphate; sodium alginate; gelatin; and acrylic acid copolymers having an amino group in their molecules and their quaternized compounds;

(2) high-molecular emulsions, for example: copolymers of various vinyl monomers such as alkyl (meth) acrylates;

(3) retarders, for example: oxycarboxylic acids such as gluconic acid, glucoheptonic acid, arabonic acid, malic acid or citric acid, and their inorganic or organic salts of sodium, potassium, calcium, magnesium, ammonium and triethanolamine; saccharides, for example, monosaccharides such as glucose, fructose, galactose, saccharose, xylose, apiose, ribose, and isomerized saccharides, or oligosaccharides such as disaccharides and trisaccharides, or oligosaccharides such as dextrin, or polysaccharides such as dextran, or molasses including them; sugar alcohols such as sorbitol; magnesium silicofluoride; phosphoric acid and its salts or borates; aminocarboxylic acids and its salt; alkali-soluble proteins; fumic acid; tannic acid; phenol; polyhydric alcohols such as glycerol; and phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and their alkaline metal salts and alkaline earth metal salts;

(4) high-early-strength agents and promotors, for example: soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonic add salts; thiosulfates; formic add and formates such as calcium formate; alkanol amines; and alumina cement;

(5) mineral oil base defoaming agents, for example: kerosine and liquid paraffin;

(6) oils-and-fats base defoaming agents, for example: animal and plant oils, sesame oil, castor oil and their alkylene oxide adducts;

(7) fatty add base defoaming agents, for example: oleic acid, stearic acid and their alkylene oxide adducts;

(8) fatty acid ester base defoaming agents, for example: glycerol monoricinolate, alkenyl succinic acid derivatives, sorbitol monolaurate, sorbitol trioleate, and natural wax;

(9) oxyalkylene base defoaming agents, for example: polyoxyalkylenes such as (poly)oxyethylene (poly)oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and adducts of oxyethylene oxypropylene to higher alcohols with 12 to 14 carbon atoms; (poly)oxyalkylene (alkyl)aryl ethers such as polyoxypropylene phenyl ether and polyoxyethylene nonyl phenyl ether; acetylene ethers as formed by addition polymerization of alkylene oxide to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleic acid ester, diethylene glycol lauric acid ester, and ethylene glycol distearic acid; (poly)oxyalkylene sorbitan fatty acid esters such as (poly)oxyethylene sorbitan monolauric acid ester and (poly)oxyethylene sorbitan trioleic acid ester; (poly)oxyalkylene alkyl (aryl) ether sulfuric acid ester salts such as sodium polyoxypropylene methyl ether sulfate, and sodium polyoxyethylene dodecylphenol ether sulfate; (poly)oxyalkylene alkyl phosphoric acid esters such as (poly)oxyethylene stearyl phosphate; (poly)oxyalkylene alkylamines such as polyoxyethylene laurylamine; and polyoxyalkylene amide;

(10) alcohol base defoaming agents, for example: octyl alcohol, hexadecyl alcohol, acetylene alcohol, and glycols;

(11) amide base defoaming agents, for example: acrylate polyamines;

(12) phosphoric acid ester base defoaming agents, for example: tributyl phosphate and sodium octyl phosphate;

(13) metal soap base defoaming agents, for example: aluminum stearate and calcium oleate;

(14) silicone base defoaming agents, for example: dimethyl silicone oils, silicone pastes, silicone emulsions, organic-denatured polysiloxanes (polyorganosiloxanes such as dimethyl polysiloxane), and fluorosilicone oils;

(15) AE agents, for example: resin soap, saturated or unsaturated fatty acids, sodium hydroxystearate, lauryl sulfate, ABS (alkylbenzenesulfonic acids), LAS (linear alkylbenzenesulfonic acids), alkanesulfonates, polyoxyethylene alkyl (phenyl) ethers, polyoxyethylene alkyl (phenyl) ether sulfuric acid esters or its salts, polyoxyethylene alkyl (phenyl) ether phosphoric acid esters or its salts, protein materials, alkenylsulfosuccinic acids, and α-olefinsulfonates;

(16) other surface active agents, for example: polyalkylene oxide derivatives as formed by addition of 10 mols or more of alkylene oxides, such as ethylene oxide and propylene oxide, to aliphatic monohydric alcohols with 6 to 30 carbon atoms in the molecules, such as octadecyl alcohol and stearyl alcohol, or to alicyclic monohydric alcohols with 6 to 30 carbon atoms in the molecules, such as abiethyl alcohol, or to monovalent mercaptans with 6 to 30 carbon atoms in the molecules, such as dodecyl mercaptan, or to alkylphenols with 6 to 30 carbon atoms in the molecules, such as nonylphenol, or to amines with 6 to 30 carbon atoms in the molecules, such as dodecylamine, or to carboxylic acids with 6 to 30 carbon atoms in the molecules, such as lauric acid and stearic acid; alkyl diphenyl ether sulfonates as formed by ether-bonding of two phenyl groups having a sulfonic acid groups, which may have an alkyl or alkoxy group as the substituent; various kinds of anionic surface active agents; various kinds of cationic surface active agents such as alkylamine acetate and alkyltrimethylammonium chloride; various kinds of nonionic surface active agents; and various kinds of amphoteric surface active agents;

(17) waterproofing agents, for example: fatty acids (or their salts), fatty acid esters, oils and fats, silicone, paraffin, asphalt, and wax;

(18) anticorrosives, for example: nitrous acid salts, phosphoric acid salts, and zinc oxide;

(19) fissure-reducing agents, for example: polyoxyalkyl ethers; and

(20) swelling materials, for example: ettringite base and coal base ones.

Examples of yet other conventional cement additives (materials to add to cement) include: cement humectants, thickeners, separation-decreasing agents, flocculants, dry-shrinkage-diminishing agents, strength-enhancing agents, self-levelling agents, anticorrosives, colorants, moldproofing agents, shaft furnace slag, fly ash, cinder ash, clinker ash, husk ash, silica fume, and silica powder. The cement composition can contain these conventional cement additives (materials to add to cement) in plural.

With regard to the components other than cement and water as included in the present invention cement composition, examples of particularly preferred embodiments are 1)~3) below.

1) A combination of the following two essential components: (1) the cement admixture of the present invention and (2) the ligninsulfonic acid salt. Incidentally, the combination ratio by weight of (1) to (2) is preferably in the range of (5~95):(95~5), more preferably in the range of (10~90):(90~10).

2) A combination of the following two essential components: (1) the cement admixture of the present invention and (2) the oxyalkylene base defoaming agent. Incidentally, the combination ratio by weight of (2) is preferably in the range of 0.01~10 weight % of (1).

3) A combination of the following three essential components: (1) the cement admixture of the present invention, (2) the copolymer as disclosed in JP-A-62-068806 and formed from alkenyl ether monomers (adducts of ethylene oxide to specific unsaturated alcohols such as 3-methyl-3-buten-1-ol), unsaturated carboxylic monomers, and monomers copolymerizable therewith, and (3) the oxyalkylene base defoaming agent. Incidentally, the combination ratio by weight of (3) is preferably in the range of 0.01~10 weight % of the total of (1) and (2).

Effects and Advantages of the Invention

As is mentioned above, the cement admixture according to the present invention displays little dependence of the water-reducibility upon temperature in that the slump loss at high temperature is little, and in that, even at low temperature, so sufficient dispersibility is exhibited that the increase in the amount of addition is small. Therefore, this cement admixture has excellent dispersibility and is effective to mortar and concrete to which high fluidity is demanded, such as highly fluidized concrete.

The cement composition according to the present invention exhibits a high flow value and has excellent fluidity, because this cement composition contains the above cement admixture.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. In addition, in the examples, unless otherwise noted, the units "%" and "part(s)" are by weight, and the weight-average molecular weight is in terms of polyethylene glycol by gel permeation chromatography (GPC).

Production Example 1

Production of Cement Admixture (1)

First of all, 150 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 180 parts of methoxypolyethylene glycol monomethacrylate (average molar number of addition of ethylene oxide: 25), 20 parts of acrylic acid, 50 parts of water and 1.9 parts of 3-mercaptopropionic acid as a chain transfer agent, was dropped together with 35 parts of a 5.2% aqueous ammonium persulfate solution for 4 hours, and then 9 parts of a 5.2% aqueous ammonium persulfate solution was further dropped for 1 hour. Thereafter, the temperature was maintained at 80° C. for 1 hour to complete the polymerization reaction, thus obtaining cement admixture (1) comprising an aqueous solution of a copolymer with a weight-average molecular weight of 23,000 corresponding to polymers (A) and (C) in the present invention.

Production Example 2

Production of Cement Admixture (2)

First of all, 150 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 180 parts of methoxypolyethylene glycol monomethacrylate (average molar number of addition of ethylene oxide: 23), 20 parts of methacrylic acid, 50 parts of water and 1.8 parts of 3-mercaptopropionic acid as a chain transfer agent, was dropped together with 35 parts of a 5.2% aqueous ammonium persulfate solution for 4 hours, and then 9 parts of a 5.2% aqueous ammonium persulfate solution was further dropped for 1 hour. Thereafter, the temperature was maintained at 80° C. for 1 hour to complete the polymerization reaction, thus obtaining cement admixture (2) comprising an aqueous solution of a copolymer with a weight-average molecular weight of 22,000 corresponding to polymers (B) and (D) in the present invention.

Production Example 3

Production of Cement Admixture (3)

First of all, 150 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 180 parts of methoxypolyethylene glycol monomethacrylate (average molar number of addition of ethylene oxide: 23), 20 parts of acrylic acid, 50 parts of water and 1.5 parts of 3-mercaptopropionic acid as a chain transfer agent, was dropped together with 35 parts of a 5.2% aqueous ammonium persulfate solution for 4 hours, and then 9 parts of a 5.2% aqueous ammonium persulfate solution was further dropped for 1 hour. Thereafter, the temperature was maintained at 80° C. for 1 hour to complete the polymerization reaction, thus obtaining cement admixture (3) comprising an aqueous solution of a copolymer with a weight-average molecular weight of 22,500 corresponding to polymers (B) and (D) in the present invention.

Production Example 4

Production of Cement Admixture (4)

First of all, 278 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 96 parts of butoxypolyethylene glycol monomethacrylate (average molar number of addition of ethylene oxide: 130), 4 parts of methacrylic acid, 100 parts of water and 0.9 parts of 3-mercaptopropionic acid as a chain transfer agent, was dropped together with 18 parts of a 5.2% aqueous ammonium persulfate solution for 4 hours, and then 4 parts of a 5.2% aqueous ammonium persulfate solution was further dropped for 1 hour. Thereafter, the temperature was maintained at 80° C. for 1 hour to complete the polymerization reaction, and the reaction mixture was then neutralized with a 30% aqueous sodium hydroxide solution, thus obtaining cement admixture (4) comprising an aqueous solution of a copolymer with a weight-average molecular weight of 52,800 corresponding to polymer salts (BB) and (DD) in the present invention.

Production Example 5

Production of Cement Admixture (5)

First of all, 278 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 95 parts of butoxypolyethylene glycol monoacrylate (average molar number of addition of ethylene oxide: 130), 6 parts of acrylic acid, 100 parts of water and 1.0 part of 3-mercaptopropionic acid as a chain transfer agent, was dropped together with 18 parts of a 5.2% aqueous ammonium persulfate solution for 4 hours, and then 4 parts of a 5.2% aqueous ammonium persulfate solution was further dropped for 1 hour. Thereafter, the temperature was maintained at 80° C. for 1 hour to complete the polymerization reaction, and the reaction mixture was then neutralized with a 30% aqueous sodium hydroxide solution, thus obtaining cement admixture (5) comprising an aqueous solution of a copolymer with a weight-average molecular weight of 51,000 corresponding to polymer salts (AA) and (CC) in the present invention.

Production Example 6

Production of Cement Admixture (6)

First of all, 278 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 96 parts of phenoxypolyethylene glycol monomethacrylate (average molar number of addition of ethylene oxide: 130), 4 parts of methacrylic acid, 100 parts of water and 0.9 parts of 3-mercaptopropionic acid as a chain transfer agent, was dropped together with 18 parts of a 5.2% aqueous ammonium persulfate solution for 4 hours, and then 4 parts of a 5.2% aqueous ammonium persulfate solution was further dropped for 1 hour. Thereafter, the temperature was maintained at 80° C. for 1 hour to complete the polymerization reaction, and the reaction mixture was then neutralized with a 30% aqueous sodium hydroxide solution, thus obtaining cement admixture (6) comprising an aqueous solution of a copolymer with a weight-average molecular weight of 51,500 corresponding to polymer salts (BB) and (DD) in the present invention.

Production Example 7

Production of Cement Admixture (7)

First of all, 278 parts of water was placed into a glass-made reaction vessel as equipped with a thermometer, a stirrer, a dropping funnel, a nitrogen-introducing tube and a reflux condenser, and the internal atmosphere of the reaction vessel was replaced with nitrogen under stirring, and the reaction vessel was heated to 80° C. under the nitrogen atmosphere. Next, an aqueous monomer solution, as prepared by mixing 95 parts of phenoxypolyethylene glycol monoacrylate (average molar number of addition of ethylene oxide: 130), 6 parts of acrylic acid, 100 parts of water and 1.0 part of 3-mercaptopropionic acid as a chain transfer agent, was dropped together with 18 parts of a 5.2% aqueous ammonium persulfate solution for 4 hours, and then 4 parts of a 5.2% aqueous ammonium persulfate solution was further dropped for 1 hour. Thereafter, the temperature was maintained at 80° C. for 1 hour to complete the polymerization reaction, and the reaction mixture was then neutralized with a 30% aqueous sodium hydroxide solution, thus obtaining cement admixture (7) comprising an aqueous solution of a copolymer with a weight-average molecular weight of 50,000 corresponding to polymer salts (AA) and (CC) in the present invention.

Mortar Test

Mortars (cement compositions), containing the cement admixtures of Examples 1 to 7 and the comparative cement admixtures of Comparative Examples 1 to 7 respectively, were prepared by combining the copolymers as obtained in the above Production Examples, and their flow values were measured as follows.

The materials, used in the test, and the mortar mixing ratio were 600 g of Chichibu Onoda's normal portland cement, 600 g of Toyoura standard sand, and 200 g of water containing the cement admixture of the present invention or containing those for comparison. The respective amounts of addition of the cement admixtures (weight % as the solid content relative to the cement) are shown in Tables 1 to 5.

(1) Mortar Test at Normal Temperature (25° C.)

The mortar was prepared by mechanical kneading with a HOBART type mortar mixer (N-50 model, made by HOBART Corporation) for 3 minutes and then filled into a hollow cylinder of 55 mm in diameter and 55 mm in height. Next, after lifting the hollow cylinder in perpendicular, the diameters of the mortar as spread on a table were measured in two directions, and the average value thereof was regarded as a flow value. Then, after keeping the entirety of the mortar static in an air-tight vessel for a predetermined period, the same operation as above was repeated to measure a change of the flow value with time. The results are shown in Tables 1 to 5.

(2) Mortar test at low temperature (5° C.)

The materials, the mortar mixer and the measurement instruments, as used for the test, were cooled under an atmosphere of 5° C., and the mortar was prepared by the same process as that at the normal temperature, thus measuring the flow values. Incidentally, the respective amounts of addition of the cement admixtures were adjusted so as to obtain almost the same flow values as those at the normal temperature. The results are shown in Tables 1 to 5.

TABLE 1

| Sort | Name of cement admixture | Sort of polymer | Normal temperature (25° C.) | | | | | Low temperature (5° C.) | | Ratio between amounts of addition (5° C./25° C.) |
|---|---|---|---|---|---|---|---|---|---|---|
| | | | Amount of addition (wt %) | Flow value (mm) after | | | | Amount of addition (wt %) | Flow value (mm) | |
| | | | | 5 minutes | 30 minutes | 60 minutes | 90 minutes | | | |
| Example 1 | Cement admixture (1) | Polymers (A), (C) | 0.15 | 109 | 124 | 113 | 108 | 0.21 | 110 | 1.40 |
| | Cement admixture (2) | Polymers (B), (D) | 0.15 | | | | | 0.21 | | |
| Example 2 | Cement admixture (1) | Polymers (A), (C) | 0.11 | 103 | 115 | 111 | 106 | 0.18 | 102 | 1.64 |
| | Cement admixture (2) | Polymers (B), (D) | 0.22 | | | | | 0.36 | | |
| Example 3 | Cement admixture (1) | Polymers (A), (C) | 0.18 | 116 | 130 | 117 | 100 | 0.22 | 107 | 1.22 |
| | Cement admixture (2) | Polymers (B), (D) | 0.09 | | | | | 0.11 | | |

(Note): Ratio between amounts of addition: amount of addition at 5° C./amount of addition at 25° C. (when two cement admixtures were jointly used, the ratio was calculated as the total of the respective amounts of addition)

TABLE 2

| Sort | Name of cement admixture | Sort of polymer | Normal temperature (25° C.) | | | | | Low temperature (5° C.) | | Ratio between amounts of addition (5° C./25° C.) |
|---|---|---|---|---|---|---|---|---|---|---|
| | | | Amount of addition (wt %) | Flow value (mm) after | | | | Amount of addition (wt %) | Flow value (mm) | |
| | | | | 5 minutes | 30 minutes | 60 minutes | 90 minutes | | | |
| Example 4 | Cement admixture (1) | Polymers (A),(C) | 0.18 | 112 | 138 | 129 | 115 | 0.21 | 120 | 1.17 |
| | Cement admixture (4) | Polymer salts (BB), (DD) | 0.18 | | | | | 0.21 | | |
| Example 5 | Cement admixture (5) | Polymer salts (AA), (CC) | 0.18 | 107 | 128 | 113 | 107 | 0.21 | 105 | 1.17 |
| | Cement admixture (4) | Polymer salts (BB), (DD) | 0.18 | | | | | 0.21 | | |
| Example 6 | Cement admixture (7) | Polymer salts (AA), (CC) | 0.18 | 101 | 119 | 110 | 100 | 0.21 | 100 | 1.17 |
| | Cement admixture (6) | Polymer salts (BB), (DD) | 0.18 | | | | | 0.21 | | |

(Note): Ratio between amounts of addition: amount of addition at 5° C./amount of addition at 25° C. (when two cement admixtures were jointly used, the ratio was calculated as the total of the respective amounts of addition)

TABLE 3

| Sort | Name of cement admixture | Sort of polymer | Normal temperature (25° C.) | | | | | Low temperature (5° C.) | | Ratio between amounts of |
|---|---|---|---|---|---|---|---|---|---|---|
| | | | Amount of addition (wt %) | Flow value (mm) after | | | | Amount of addition (wt %) | Flow value (mm) | addition (5° C./25° C.) |
| | | | | 5 minutes | 30 minutes | 60 minutes | 90 minutes | | | |
| Example 7 | Cement admixture (7) | Polymer salts (AA), (CC) | 0.18 | 105 | 123 | 111 | 103 | 0.21 | 101 | 1.17 |
| | Cement admixture (4) | Polymer salts (BB), (DD) | 0.18 | | | | | 0.21 | | |

(Note): Ratio between amounts of addition: amount of addition at 5° C./amount of addition at 25° C. (when two cement admixtures were jointly used, the ratio was calculated as the total of the respective amounts of addition)

TABLE 4

| Sort | Name of cement admixture | Sort of polymer | Normal temperature (25° C.) | | | | | Low temperature (5° C.) | | Ratio between amounts of |
|---|---|---|---|---|---|---|---|---|---|---|
| | | | Amount of addition (wt %) | Flow value (mm) after | | | | Amount of addition (wt %) | Flow value (mm) | addition (5° C./25° C.) |
| | | | | 5 minutes | 30 minutes | 60 minutes | 90 minutes | | | |
| Comparative Example 1 | Cement admixture (2) | Polymers (B), (D) | 0.15 | 106 | 152 | 159 | 160 | 0.45 | 103 | 3.00 |
| | Cement admixture (3) | Polymers (B), (D) | 0.15 | | | | | 0.45 | | |
| Comparative Example 2 | Cement admixture (1) | Polymers (A), (C) | 0.20 | 113 | 118 | 89 | 62 | 0.24 | 111 | 1.20 |
| Comparative Example 3 | Cement admixture (2) | Polymers (B), (D) | 0.40 | 108 | 132 | 139 | 144 | 3.20 | 90 | 8.00 |
| Comparative Example 4 | Cement admixture (4) | Polymer salts (BB), (DD) | 1.20 | 112 | 160 | 170 | 160 | 2.64 | 105 | 2.20 |

(Note): Ratio between amounts of addition: amount of addition at 5° C./amount of addition at 25° C. (when two cement admixtures were jointly used, the ratio was calculated as the total of the respective amounts of addition)

TABLE 5

| Sort | Name of cement admixture | Sort of polymer | Normal temperature (25° C.) | | | | | Low temperature (5° C.) | | Ratio between amounts of |
|---|---|---|---|---|---|---|---|---|---|---|
| | | | Amount of addition (wt %) | Flow value (mm) after | | | | Amount of addition (wt %) | Flow value (mm) | addition (5° C./25° C.) |
| | | | | 5 minutes | 30 minutes | 60 minutes | 90 minutes | | | |
| Comparative Example 5 | Cement admixture (5) | Polymers salts (AA), (CC) | 0.30 | 111 | 127 | 99 | 70 | 0.33 | 112 | 1.10 |
| Comparative Example 6 | Cement admixture (6) | Polymer salts (BB), (DD) | 1.40 | 106 | 165 | 170 | 165 | 3.20 | 100 | 2.29 |
| Comparative Example 7 | Cement admixture (7) | Polymer salts (AA), (CC) | 0.30 | 104 | 123 | 96 | 68 | 0.36 | 118 | 1.20 |

(Note): Ratio between amounts of addition: amount of addition at 5° C./amount of addition at 25° C. (when two cement admixtures were jointly used, the ratio was calculated as the total of the respective amounts of addition)

From Tables 1 to 5, it is understood that the mortars containing the comparative admixtures involve either great slump loss at the normal temperature, or a great ratio of increase in the necessary amount of addition at the low temperature, or a very large necessary amount of addition at both the normal and low temperatures, while the mortar containing the cement admixture of the present invention merely involves greatly suppressed decrease in the flow value even after 90 minutes at the normal temperature and thus displays excellent slump-loss-decreasing effects and further merely involves a small ratio of increase in the necessary amount of addition at the low temperature.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cement composition, comprising cement, a cement admixture, and water, wherein the cement admixture includes the following essential components:

either or both of polymer (A) and polymer salt (AA), wherein polymer (A) includes constitutional unit (I) of general formula (1) below as an essential constitutional unit, and polymer salt (AA) is obtained by further neutralizing polymer (A) with an alkaline substance; and either or both of polymer (B) and polymer salt (BB), wherein polymer (B) includes constitutional unit (II) of general formula (2) below as an essential constitutional unit, and polymer salt (BB) is obtained by further neutralizing polymer (B) with an alkaline substance;

wherein general formula (1) is

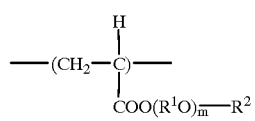

(1)

and general formula (2) is

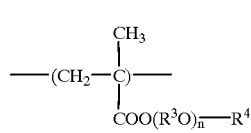

(2)

wherein: each of $R^1O$ and $R^3O$ denotes one kind of oxyalkylene group with 2 to 18 carbon atoms or a mixture of two or more kinds thereof, wherein the mixture may be formed by either block addition or random addition; each of m and n is an average molar number of addition of the oxyalkylene groups and denotes a positive number of 1 or more; and each of $R^2$ and $R^4$ denotes a hydrocarbon group with 1 to 30 carbon atoms.

2. A cement composition according to claim 1, wherein polymer (A) further includes constitutional unit (III) of general formula (3) below:

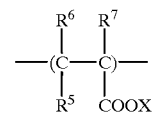

(3)

wherein: $R^5$, $R^6$ and $R^7$, independently of each other, denote a hydrogen atom, a methyl group or a $(CH_2)_pCOOX$ group; X denotes a hydrogen atom, a monovalent metal, a divalent metal, an ammonium group or an organic amine group; and p denotes an integer of 0 to 2; wherein two COOX groups may form an anhydride, if any.

3. A cement composition according to claim 1, wherein polymer (B) further includes constitutional unit (III) of general formula (3) below:

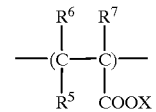

(3)

wherein: $R^5$, $R^6$ and $R^7$, independently of each other, denote a hydrogen atom, a methyl group or a $(CH_2)_pCOOX$ group; X denotes a hydrogen atom, a monovalent metal, a divalent metal, an ammonium group or an organic amine group; and p denotes an integer of 0 to 2; wherein two COOX groups may form an anhydride, if any.

4. A cement composition according to claim 2, wherein polymer (B) further includes constitutional unit (III) of general formula (3) below:

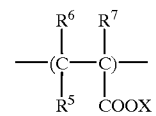

(3)

wherein: $R^5$, $R^6$ and $R^7$, independently of each other, denote a hydrogen atom, a methyl group or a $(CH_2)_pCOOX$ group; X denotes a hydrogen atom, a monovalent metal, a divalent metal, an ammonium group or an organic amine group; and p denotes an integer of 0 to 2; wherein two COOX groups may form an anhydride, if any.

5. A cement composition according to claim 1, wherein m and n are both in the range of 15 to 300.

6. A cement composition according to claim 2, wherein the content of constitutional unit (III) is 30 weight % or less of polymer (A).

7. A cement composition according to claim 3, wherein the content of constitutional unit (III) is 30 weight % or less of polymer (B).

8. A cement composition according to claim 2, wherein constitutional unit (III) includes a constitutional unit as derived from an acrylic monomer.

9. A cement composition according to claim 3, wherein constitutional unit (III) includes a constitutional unit as derived from an acrylic monomer.

10. A cement composition, comprising cement, a cement admixture, and water, wherein the cement admixture includes the following essential components:

either or both of polymer (C) and polymer salt (CC), wherein polymer (C) is obtained by polymerizing monomer component (X) including monomer (a) of general formula (4) below as an essential component, and polymer salt (CC) is obtained by further neutralizing polymer (C) with an alkaline substance; and either or both of polymer (D) and polymer salt (DD), wherein polymer (D) is obtained by polymerizing monomer component (Y) including monomer (b) of general formula (5) below as an essential component, and polymer salt (DD) is obtained by further neutralizing polymer (D) with an alkaline substance;

wherein general formula (4) is

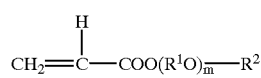

(4)

and general formula (5) is

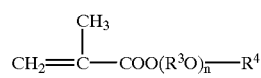

(5)

wherein: each of $R^1O$ and $R^3O$ denotes one kind of oxyalkylene group with 2 to 18 carbon atoms or a mixture of two or more kinds thereof, wherein the mixture may be formed by either block addition or random addition; each of m and n is an average molar number of addition of the oxyalkylene groups and denotes a positive number of 1 or more; and each of $R^2$ and $R^4$ denotes a hydrocarbon group with 1 to 30 carbon atoms.

11. A cement composition according to claim 10, wherein monomer component (X) further includes unsaturated carboxylic monomer (c).

12. A cement composition according to claim 10, wherein monomer component (Y) further includes unsaturated carboxylic monomer (c).

13. A cement composition according to claim 11, wherein monomer component (Y) further includes unsaturated carboxylic monomer (c).

14. A cement composition according to claim 10, wherein m and n are both in the range of 15 to 300.

15. A cement composition according to claim 11, wherein the content of unsaturated carboxylic monomer (c) is 30 weight % or less of monomer component (X).

16. A cement composition according to claim 12, wherein the content of unsaturated carboxylic monomer (c) is 30 weight % or less of monomer component (Y).

17. A cement composition according to claim 11, wherein unsaturated carboxylic monomer (c) includes an acrylic monomer.

18. A cement composition according to claim 12, wherein unsaturated carboxylic monomer (c) includes an acrylic monomer.

* * * * *